United States Patent [19]

Hahn

[11] 4,024,303

[45] May 17, 1977

[54] METHOD OF APPLYING A FIRMLY ADHERENT METALLIC COATING TO TITANIUM AND TITANIUM ALLOY

[75] Inventor: Hans-Jürgen Hahn, Hamburg, Germany

[73] Assignee: Messerschmitt-Bolkow-Blohm GmbH, Germany

[22] Filed: Sept. 2, 1975

[21] Appl. No.: 609,522

[30] Foreign Application Priority Data

Sept. 6, 1974  Germany ............................ 2442742

[52] U.S. Cl. ............................... 427/295; 427/309; 427/328; 427/405; 427/422; 427/427; 428/660

[51] Int. Cl.² ............................................. C23C 7/00

[58] Field of Search ............ 427/309, 428, 427, 34, 427/310, 328, 156; 134/3; 29/198; 148/25, 23; 252/79.4, 79.3, 81, 105; 204/32 R

[56] References Cited

UNITED STATES PATENTS

| | | |
|---|---|---|
| 2,257,186 | 9/1941 | Orthner ............................. 252/105 |
| 2,833,668 | 5/1958 | Dailey et al. ....................... 427/292 |
| 2,935,428 | 5/1960 | Huff ................................ 252/105 X |
| 3,339,271 | 9/1967 | Durfee et al. ................... 427/438 X |
| 3,505,181 | 4/1970 | Marshall ........................... 204/37 R |
| 3,553,015 | 1/1971 | Dohogne ...................... 204/32 R X |

*Primary Examiner*—Ralph S. Kendall
*Attorney, Agent, or Firm*—McGlew and Tuttle

[57] ABSTRACT

A structural part made of titanium and/or titanium alloy is given a surface treatment by sandblasting or chemical pickling and is provided with a protective film of a strong reducing agent such as a solution of a derivative of hydrazine or hydroxylamine which is applied directly over the titanium and immediately thereafter a slide layer of a nickel is applied over the reducing agent layer preferably by spraying. Complex derivatives of hydrazine and hydroxylamine in the form of salts may be applied during a pickling and descaling treatment. The adhesion of the wear-resistant layer of metal is improved by a refining at a temperature of about 300° C to obtain an intermetallic bond between the titanium and nickel at the interfacial boundary.

10 Claims, 1 Drawing Figure

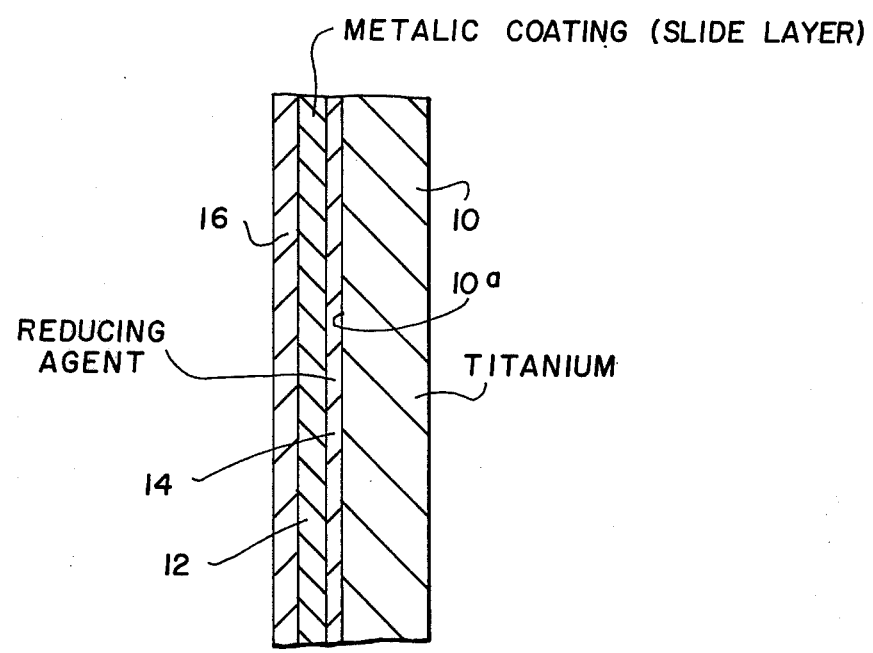

METHOD OF APPLYING A FIRMLY ADHERENT METALLIC COATING TO TITANIUM AND TITANIUM ALLOY

FIELD AND BACKGROUND OF THE INVENTION

This invention relates in general to titanium having a firmly adherent metallic coating and to a method of producing the coated titanium.

DESCRIPTION OF THE PRIOR ART

Titanium and titanium alloys have a number of excellent properties which have substantially increased the importance of these materials in various fields of application, primarily in the aero and astronautical fields. Titanium and its alloys have a number of disadvantages in these particular fields which are not acceptable, for example, their poor sliding characteristics and strong abrasion and a tendency of wearing away at a dry friction. In addition, constructional parts of titanium are affected by the fretting corrosion which is caused by high pressure which acts particularly on screws, bolts, and other connecting elements.

Numerous methods have been proposed for attempting to eliminate the disadvantages of the titanium materials or to at least reduce the undesirable characteristics. Thus, to improve the wearing properties of titanium parts, it has been recommended to subject them to a heat treatment and salt bath or to provide metal coatings by electro-or currentless deposition. Many of these methods can be applied advantageously only in cases where the loading of such structural parts will be relatively small. With higher loads, the application of other additional materials has become necessary. For example, the application of a steel layer has been applied. However, this strongly affects the favorable weight conditions to be obtained with titaniumup to a point at which it is no longer acceptable. Titaniumhas a strong tendency to combine with oxygen and nitrogen and, for this reason, it is difficult to effect a firm adherence of metal layers to titanium or titanium alloys. Even at room temperatures, new oxide and oxide layers form very rapidly on titanium surfaces which have just been cleaned. These very thin layers are electrically conducting so that electrodeposition of the metals can be attempted but the adherence is unsatisfactory and often the reproducibility of the layer construction is not possible. The affinity of titanium and titanium alloys to oxygen and nitrogen and the formation of non-metallic surface films connected thereto make the application of firmly adhering metal coatings to these materials very difficult.

A known method of cleaning surfaces of metals and alloys having a strong affinity to oxygen and nitrogen is carried out by exposing the surfaces to be cleaned to the action of an organic liquid, such as, an ester or alcohol. This substance must prevent chemical reactions which would produce compounds disturbing to metallization. Experience has shown, however, that even in such a case, it is very difficult to apply thicker slide layers to obtain wear-resistant surfaces. To solve the problem of bonding a metal layer applied by spraying, with a relatively smooth metal surface, a fusion welding method has been disclosed in which small nickel pieces are deposited by a nickel electrode on the surface of the base metal and then fused thereon. While the nickel becomes fused to the base metal, the layers applied subsequently by spraying are bonded only mechanically to the base metal and the projecting nickel particles. The firmness of these bonds is completely unsatisfactory, particularly for aero- and astronautic purposes.

A further known method of applying additional layers is the so-called spray welding method. Here, a molybdenum layer is applied by spraying to the base metal surface. This results in a satisfactory bond between the base metal layer and the metal sprayed thereon, but the adhesion betweenthe molybdenum and the base metal, particularly when requirements of repeated use are to be met, must be supported by considerable additional provisions. Such provisions require a system of undercut grooves in the base metal surface to assist the adhesive power by the mechanical interlocking of the carrier layer and the sprayed molybdenum. A further weighty drawback to the methods of providing such composite layers is that they require an intense heat leading to a deformation of the base metal.

Another method which is known for improving the adhesive strength of metal layers by a preliminary superficial roughening of the base metal in which the roughening of the surface is effected by electric sparks while using a metallic, non-consumable electrode and small cavities or holes are formed. After roughening the surface, a thin intermediate metal layer is applied by spraying and this is roughened by means of an electric spark application while using a metallic, non-consumable electrode and, at the same time, fusing the intermediate layer on the base metal. For the intermediate layer, a metal is used which has a lower fusion point than the metal of the final sprayed layer. After the electric spark erosion, the surface is subjected to a slight blowing operation with an abrasive in order to remove the carbon-containing deposits left behind by the sparks. This method, however, does not solve the problem of applying firmly adherent layers to titanium or titanium alloys because, in practice, even molybdenum layers applied by plasma deposition show unsatisfactory adhesion to titanium.

Up to this time, attempts have been made to counteract the oxidation in the period of time between the cleaning and the metallizing operation by a continuous wetting with water. However, since in most cases, water contains air and other gases in solution, undesirable surface reactions cannot be prevented entirely and, therefore, the method can be used only if a surface refinement by electrodeposition is provided. In a metal coating by spraying, it would be necessary to dry the titanium part at least immediately before the spraying operation and, thereby, to expose it to air which would instantly be followed by an oxidation.

In order to improve the sliding properties in bearings, for example, self-lubricating layers of sintered bronze with oil retained in the pores have been applied to titanium alloys as mating materials. In this case, however, experience has shown that, even after a sandblasting of the surface, bronze sprayed on titanium or titanium alloys adheres so badly that the applied sinter layers easily peel off at relatively minimum loads and, consequently, they cannot be used as slide layers.

SUMMARY OF THE INVENTION

In accordance with the invention, there is provided a method of eliminating the difficulties of the prior art and to provide a titanium or titanium alloy having a firmly adherent metal layer which is applied in a metal-spraying operation.

In accordance with the invention, the surface of the titanium or the titanium alloy which is to be coated is subjected to a reducing agent which forms a clean oxide free titanium surface and thereafter a nickel layer is sprayed thereon. During the spraying of the nickel the reducing solution evaporates without residue and leaves behind a clean oxide free titanium surface. Thereafter strong bonding between the metal coating and the nickel and the titanium is effected.

The inventive method further provides that during and descaling and cleaning of the parts in acid pickling baths, strongly reducing salts in the form of fluorides of hydrazine or hydroxylamine derivatives are added. Thereby, the oxides and nitrides of titanium are dissolved and complexes are formed, namely, hydrazonium hexafluotitanate $(N_2H_5)_2(TiF_6)$ or hydroxyl ammonium hexaluotitanate $(NH_3OH)_2 (TiF_6)$. At the same time, the air oxygen dissolved in the pickling baths is removed so that a new oxide formation is prevented.

An object of the invention is to provide a method of facing a constructional part made of titanium and/or titanium alloy with a metal coating which comprises subjecting the surface of the titanium to the action of a reducing agent in order to form a clean oxide free titanium surface, spraying the titanium surface with an intermediate layer of nickel so as to effect a diffusion of the nickel into the protective film and the surface of the constructional part and thereafter applying a metal coating over the intermediate layer of nickel.

A further object of the invention is to provide a method of forming a strongly adherent titanium alloy coating.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a representation of a titanium or titanium alloy which has been coated with a reducing agent and an intermediate slide layer of a metallic coating.

DESCRIPTION OF THE PREFERRED EMBODIMENT

In accordance with the method of the invention a structural part made of titanium or titanium alloy is designated 10 and is first subjected to a cleaning operation such as sand blasting or chemical pickling and in addition it is subjected to the action of a strong reducing agent or reducing agent having a high Redox potential for example of pH 7. The reducing agent evaporated without residue and leaves behind a clean oxide free titanium surface but a layer 14 is used to designate the reducing agent. Thereafter a coating of nickel 12 is applied preferably by spraying which causes the reducing agent layer 14 to become diffused so that in the final construction it would no longer be present. The reducing agent comprises advantageously a derivative of hydrazine or hydroxylamine.

For various titanium alloys, the invention provides an improved adhesion of the wear-resistant layer by a refinement at temperatures of about 300° C, whereby, an intermetallic bond between the titanium 10 and the nickel 12 is obtained. Slide layers 12 which are applied in this manner adhere so well that they can be machined without peeling off.

In a preferred arrangement, highly porous sintered layers are applied to the metallic coating 12 by spraying, and they are impregnated in a vacuum with oil or other antifriction liquids. To improve the sliding properties, it is preferable to sinter in solid lubricants in the form of molybdenum disulfide or graphite during the spraying of the slide layer 12.

An example of the treatment of materials to form a firmly adhering facing is as follows:

Bolts and bearing brushes made of an alloy Ti6Al4V are provided with a self-lubricating slide layer of a bronze instead of a nickel such as indicated in the drawing. For this purpose, the titanium alloy parts are first subjected to a preliminary surface treatment by degreasing and sandblasting in order to clean the surface.

Immediately after the cleaning treatment, the parts are sprayed with a solution of unsymmetrical dimethylhydrazine in dioxan with the proportion being approximately 1:80. Thereby a continuous, thin protective film is immediately formed on the surface of the part preventing any oxidation of the exposed metal surface through air action for at least three minutes. In the course of these three minutes following the spraying, a nickel layer is applied by spraying as an intermediate layer. Thereupon, without any delay, a 1 mm thick layer, for example of a tin-bronze SnBz6 according to DIN 17662 is applied by spraying on the still not constructional parts thus prepared. This outer metal layer 16 which, in this instance is a bronze, will adhere to the titanium part 10 so firmly that the surface can be machined without any difficulty. Finally, the outer layer 16 which is obtained is porous and is impregnated in a vacuum at 50° C with an oil which comprises a high-pressure additive (hypoid-oil), whereby, a perfectly working and loadable bronze slide layer is obtained.

The thin nickel layer 12 which is deposited between the titanium surface 10a and the thicker layer of bearing metal to be applied proves to be the appropriate intermediary for the adhesion. In order to obtain a sound bond between the titanium or titanium alloy and the nickel layer, an intermediate locking of titanium and nickel must take place by a diffusion of the nickel into the constructional part. This is immediately brought about during the spraying of the nickel layer because the diffusion starts at the working temperature.

The sliding properties of the applied bearing material can be further improved by providing a metal spraying with a metal powder comprising admixtures of solid lubricants, such as molybdenum sulfide or graphite.

In cases where a wet pickling process is employed for removing the oxide film and cleaning the surface 10a of the titanium, a solution of a 40% hydrofluoric acid and unsymmetrical dimethyl hydrazoniumfluoride in a corresponding quantity of water has, in practice, proved particularly suitable for forming the protective film against oxidation. In the face of the opinion hitherto maintained in the prior art and holding that, as a rule, hydrofluoric acid containing pickling solutions exclude the possibility of providing the pickled surfaces of a titanium part with a firmly adhering metal coating, the present inventive method proves that just the opposite is true.

While a specific embodiment of the invention has been shown and described in detail to illustrate the application of the principles of the invention, it will be understood that the invention may be embodied otherwise without departing from such principles.

What is claimed is:

1. A method of facing a constructional part made of a titanium and/or titanium alloy with a metal coating, comprising subjecting the surface of the titanium or titanium alloy to a reducing agent to form a clean oxide free titanium surface having a protective film thereon, spraying an intermediate layer of nickel over the protective film so as to effect a diffusion of the nickel into the protective film and the surface of the constructional part, and thereafter applying the metal coating over the intermediate layer of nickel.

2. A method according to claim 1, wherein the reducing agent comprises a derivative of hydrazine.

3. A method according to claim 1, wherein the reducing agent comprises a derivative of hydroxylamine.

4. A method according to claim 1, including exposing the surface of the titanium or titanium alloy to a pickling bath which contains the reducing agent so as to clean the surface of titanium and to also descale the surface.

5. A method according to claim 4, wherein the pickling agent is in the form of a derivative of hydrazine in the form of salts added to the pickling bath.

6. A method according to claim 1, wherein the adhesion of the metal layer to the constructional part is improved by spraying the nickel layer onto the part at a temperature of about 300° C to effect an intermetallic bond between the titanium and the nickel.

7. A method according to claim 1, wherein the outer metal layer is applied by spraying.

8. A method of facing a constructional part made of titanium and/or titanium alloy, comprising subjecting the constructional part to a surface treatment by sandblasting or chemical pickling, in order to clean the surface, immediately after the cleaning, spraying the constructional part with a solution of unsymmetrical dimethyl-hydrazine in dioxan to form a continuous, thin protective film on the surface of the part, preventing any oxidation of the exposed metal surface to air action for at least three minutes and during this three minutes, applying a nickel layer by spraying to form an intermediate sliding layer, thereafter without delay, applying a layer of the metal coating to be applied by spraying on the still hot constructional part.

9. A method according to claim 8, wherein the metal part which is sprayed over the nickel layer is porous and including impregnating the metal coating in a vacuum at 50° C with an oil comprising a high-pressure additive.

10. A method according to claim 8, wherein the slide layer is applied together with solid lubricants in the form of molybdenum disulfide or graphite which is sintered in.

* * * * *